United States Patent
Rui et al.

(10) Patent No.: US 6,450,286 B1
(45) Date of Patent: Sep. 17, 2002

(54) RACK AND PINION POWER STEERING SYSTEM WITH VARIABLE DAMPING CHARACTERISTICS

(75) Inventors: Yuting Rui, Ann Arbor, MI (US); Timothy Gerard Offerle, Whittaker, MI (US); Thomas J. Walsh, Northville, MI (US); Dexin Wang, Livonia, MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/694,969

(22) Filed: Oct. 24, 2000

(51) Int. Cl.[7] .................................................. B62D 5/06
(52) U.S. Cl. .......................... 180/441; 180/442; 251/35
(58) Field of Search ................................. 180/441, 417, 180/418, 419, 422, 421, 423, 427, 428, 439, 442, 6.3, 367, 430, 415; 251/12, 22, 30.01, 28, 33, 35, 42, 45, 46; 73/262, 269, 271, 248, 249, 861

(56) References Cited

U.S. PATENT DOCUMENTS

| | | | | | |
|---|---|---|---|---|---|
| 3,896,908 A | * | 7/1975 | Petrak | ......................... | 188/280 |
| 4,566,477 A | * | 1/1986 | Barker et al. | ................ | 137/101 |
| 4,705,132 A | * | 11/1987 | Tsuchiya | .................... | 180/428 |
| 4,949,802 A | * | 8/1990 | Gage | ........................... | 180/132 |
| 5,261,637 A | * | 11/1993 | Curnow | .................. | 251/129.15 |
| 5,293,952 A | * | 3/1994 | Ledamoisel et al. | ......... | 137/101 |
| 5,435,698 A | * | 7/1995 | Phillips | ....................... | 417/220 |
| 5,544,715 A | * | 8/1996 | Phillips | ....................... | 181/417 |
| 5,600,955 A | * | 2/1997 | Sahinkaya | .................... | 60/469 |
| 6,148,853 A | * | 11/2000 | Wang | ....................... | 137/439.6 |
| 6,164,320 A | * | 12/2000 | Hamano et al. | .......... | 137/493.2 |
| 2001/0045318 A1 | * | 11/2001 | Wang | .......................... | 180/421 |

FOREIGN PATENT DOCUMENTS

| JP | 58-139867 | * | 8/1983 |
| JP | 6067266 | * | 4/1985 |
| JP | 61159283 | * | 10/1986 |

* cited by examiner

Primary Examiner—Kevin Hurley
Assistant Examiner—Daniel Yeagley
(74) Attorney, Agent, or Firm—Ford Global Tech., Inc.

(57) ABSTRACT

A rack and pinion power steering system 10 is provided and includes a variable orifice valve 22 which controls the flow of fluid in and out of a hydraulic cylinder 20. Variable orifice valve 22 is communicatively coupled to a source of pressurized fluid 30 by use of a conduit 42 and an electronically controlled valve assembly 38. The pressurized fluid received through conduit 42 controls the operation of valve 22. Based upon the pressure of the received fluid, valve 22 selectively increases and decreases the volume of fluid flow in and out of cylinder 20, thereby causing cylinder 20 to have enhanced damping characteristics during certain vehicle operating conditions (e.g., during relatively high vehicle speed operating conditions).

14 Claims, 3 Drawing Sheets

RACK AND PINION POWER STEERING SYSTEM WITH VARIABLE DAMPING CHARACTERISTICS

FIELD OF THE INVENTION

This invention relates to a rack and pinion power steering system with variable damping characteristics and more particularly, to a rack and pinion power steering system with variable damping characteristics which includes a variable orifice valve which allows the damping characteristics of the steering system to be selectively and controllably altered based upon the speed and steering wheel angle of the vehicle.

BACKGROUND OF THE INVENTION

Rack and pinion power steering systems include a hydraulic cylinder which selectively provides forces to the rack, effective to assist the driver in steering the vehicle. Particularly, these power steering systems utilize a control valve to selectively pressurize the hydraulic fluid or oil within the left and/or right chambers of the cylinder. This pressurization is based upon the rotary motion of the steering wheel and is converted by the cylinder into an assisting force which acts on the rack and which intensifies the steering force exerted by the driver.

Hydraulic cylinders used within rack and pinion power steering systems provide some amount of damping against forces that are transmitted to the steering wheel that may result from irregularities in the road surface. However, because the flow of fluid in and out of the cylinder is not properly limited to enhance damping, the damping capabilities of these cylinders are relatively limited.

Some steering systems include damper assemblies which provide a desired amount of damping. These damper assemblies provide a damping force which varies based upon the velocity of the damper according to a certain function, relationship or curve. However, these conventional damper assemblies have several drawbacks. Particularly, conventional damper assemblies typically have a single force versus velocity function or curve which does not vary based upon vehicle speed or other parameters. As a result, conventional damper assemblies have either a relatively high force/velocity curve which provides high damping of impacts while compromising steering effort, or have a relatively low force/velocity curve which maintains power steering effort at a desirable level, but does not substantially reduce steering "shimmy" and "nibble". Moreover, these damper assemblies undesirably add to the cost of the vehicle.

There is therefore a need for a rack and pinion power steering system having variable damping characteristics which overcomes the drawbacks of prior steering systems and assemblies.

SUMMARY OF THE INVENTION

A first advantage of the invention is that it provides a rack and pinion power steering system having variable damping characteristics which overcomes some or all of the previously delineated drawbacks of prior steering systems and assemblies.

A second advantage of the invention is that it provides a rack and pinion power steering system having variable damping which does not require the use of additional damping assemblies.

A third advantage of the present invention is that it provides a rack and pinion power steering system which utilizes a variable orifice valve which controls the flow of fluid in and out of the system's steering cylinder in a manner which allows the cylinder to provide variable self-damping to impacts and vibration based upon vehicle speed and steering wheel angle.

A fourth advantage of the present invention is that it provides a rack and pinion power steering system having variable damping characteristics which provides relatively high damping at high vehicle speeds and high power steering effort at low vehicle speeds and during parking maneuvers.

According to a first aspect of the present invention, a power steering system is provided. The power steering system includes a rack and pinion assembly; a hydraulic cylinder which is operatively coupled to the rack and pinion assembly and which selectively provides a steering assist force to the rack and pinion assembly; and a variable orifice valve which is fluidly coupled to the hydraulic cylinder and which allows a certain amount of pressurized fluid to flow in and out of the hydraulic cylinder, the variable orifice valve having a variable volume fluid flow passage which is effective to selectively increase and decrease the fluid flow in and out of the hydraulic cylinder, thereby selectively altering the damping characteristics of the hydraulic cylinder.

According to a second aspect of the present invention, a valve assembly is provided. The valve assembly includes a housing having an interior cavity and at least one conduit which forms at least one fluid flow path; and a member slidably disposed within the interior cavity and having at least one tapered channel which cooperates with the at least one conduit to form the at least one fluid flow path, the member being selectively movable from a first position in which the at least one tapered channel causes the at least one fluid flow path to have a first volume, to a second position in which the at least one tapered channel causes the at least one fluid flow path to have a second volume.

According to a third aspect of the present invention, a method is disclosed for providing damping within a power steering system of the type including a rack and pinion assembly and a hydraulic cylinder which is coupled to the rack and pinion assembly and which provides an assist force to the rack and pinion assembly. The method includes the steps of providing at least one fluid flow path to the hydraulic cylinder for selectively communicating pressurized fluid to the hydraulic cylinder, effective to selectively cause the hydraulic cylinder to provide the assist force; and selectively varying the volume of the at least one fluid flow path.

These and other objects, aspects, features, and advantages of the present invention will become apparent from a consideration of the following specification and the attached drawings.

DETAILED DESCRIPTION OF THE PREFERRED EMBODIMENT OF THE INVENTION

Figure 1:
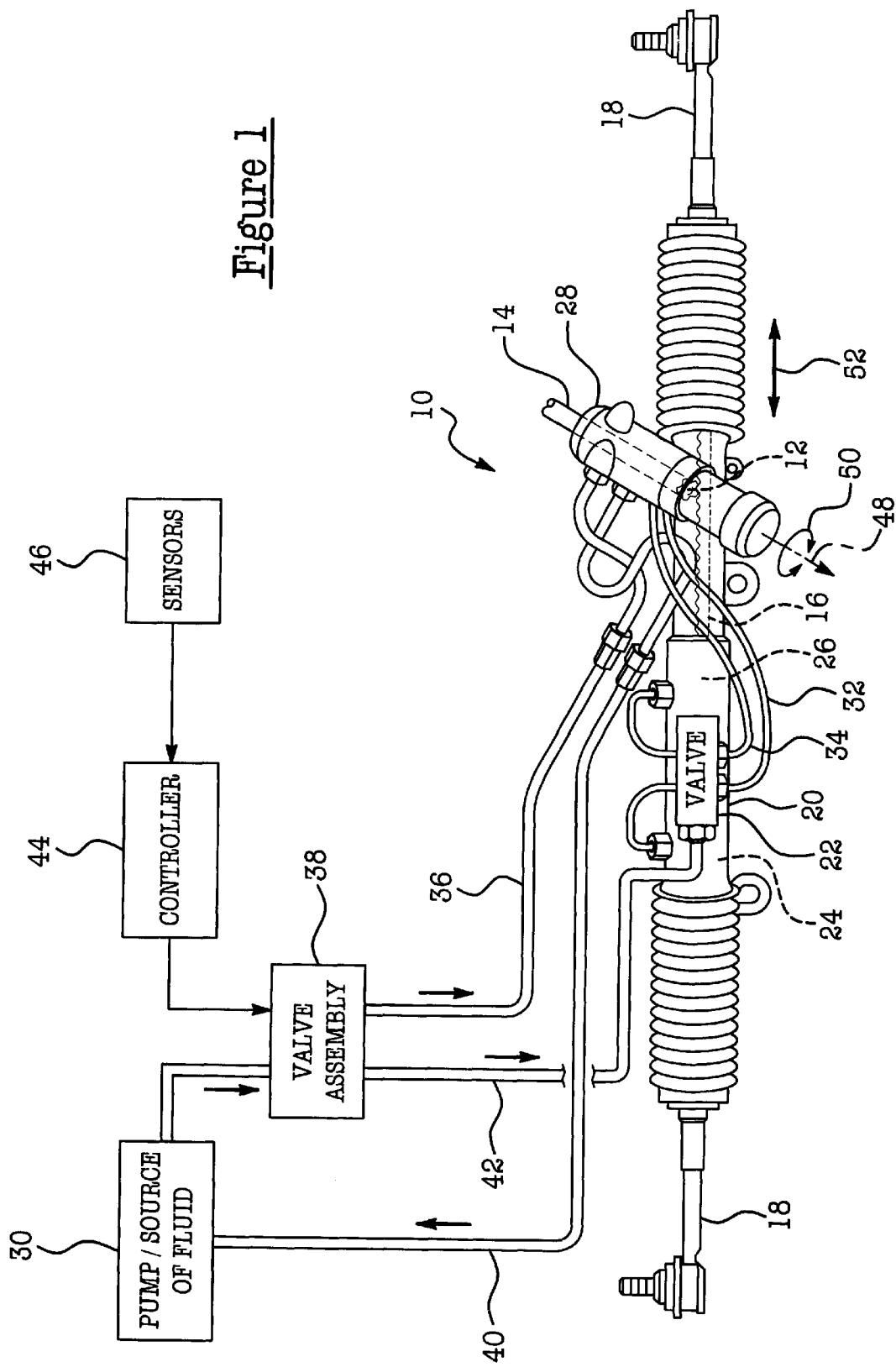
FIG. 1 is a schematic view of a rack and pinion power steering system having variable damping characteristics and which is made in accordance with the teachings of the preferred embodiment of the invention.

Referring now to FIG. 1, there is shown a rack and pinion power steering assembly 10 having variable damping characteristics which is made in accordance with the teachings of the preferred embodiment of the invention and which is adapted for use with a vehicle. As shown, steering assembly 10 includes a pinion member 12 which is operatively attached to a steering shaft 14, a rack member 16 which is engaged by pinion member 12, a tie rod assembly 18 which is attached to rack member 16, a hydraulic steering cylinder 20 which is attached to rack member 16 and tie rod assembly 18 and which provides assisting forces to rack member 16.

Steering assembly 10 further includes a variable orifice valve 22 and a steering control valve 28. Steering control valve 28 is fluidly coupled to the right and left chambers of cylinder 20 by way of conduits 32, 34, respectively. Variable orifice valve 22 is operatively disposed along and/or within conduits 32, 34 and selectively controls the flow of fluid in and out of cylinder 20, and more particularly, in and out of the right chamber 24 and left chamber 26 of cylinder 20. Variable orifice valve 22 is communicatively coupled to a source of pressurized fluid 30 (e.g., a conventional fluid reservoir and pump assembly) by use of a conduit 42 and an electronically controlled valve assembly 38 (e.g., a solenoid valve). As explained more fully and completely below, the pressurized fluid received through conduit 42 controls the operation of valve 22. Control valve 28 receives pressurized fluid from source 30 through conduit 36 and electronically controlled valve assembly 38, and returns fluid to source 30 by way of conduit 40. Valve 38 is communicatively coupled to a conventional electronic controller 44 which controls the operation of valve 38 based upon data (e.g., steering wheel angle and vehicle speed data) received from sensors 46. Sensors 46 are conventional vehicle attribute sensors which are effective to measure or sense certain vehicle attributes (i.e., steering wheel angle and vehicle speed) and to communicate signals to controller 44 representing those measured attributes.

Pinion 12 and rack 16 collectively form a conventional rack and pinion steering assembly. Particularly, pinion 12 is a conventional pinion that engages teeth which are integrally formed within rack 16 and which are shaped to provide a desired ratio of pinion revolutions to rack movement. As pinion 12 is selectively rotated about its longitudinal axis 48 in the directions of arrows 50, rack 16 is moved in the directions of arrows 52, effective to move conventional tie rod assembly 18, thereby turning the wheels of the vehicle.

Steering cylinder 20 is a conventional "double-acting" hydraulic steering cylinder. Cylinder 20 receives fluid pressure through conduits 32 and 34, and converts the received pressure into forces which act on the rack 16 and tie rod assembly 18 in the directions of arrows 52. These forces provided by cylinder 20 intensify or augment the driver-produced forces that are transmitted to rack 16 by steering shaft 14 and pinion 12. As discussed more fully and completely below, cylinder 20 further provides an amount of damping against road impacts and forces which are transmitted from the wheels of the vehicle to the steering assembly 10 through tie rod assembly 18.

Figure 2:
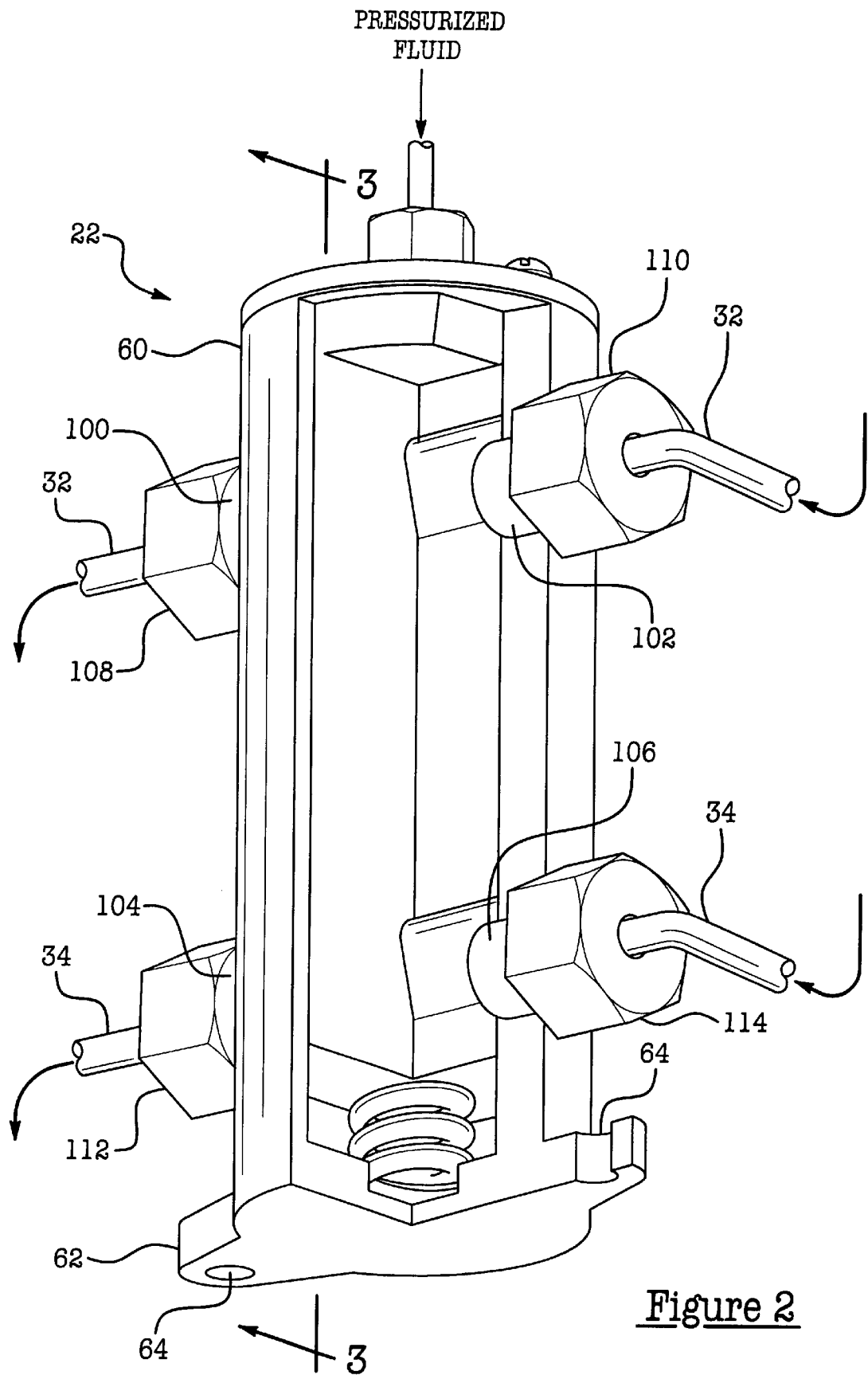
FIG. 2 is a perspective, partial cutaway view of a variable orifice valve which is used within the power steering system shown in FIG. 1, illustrating a portion of the interior of the valve.
Figure 3:
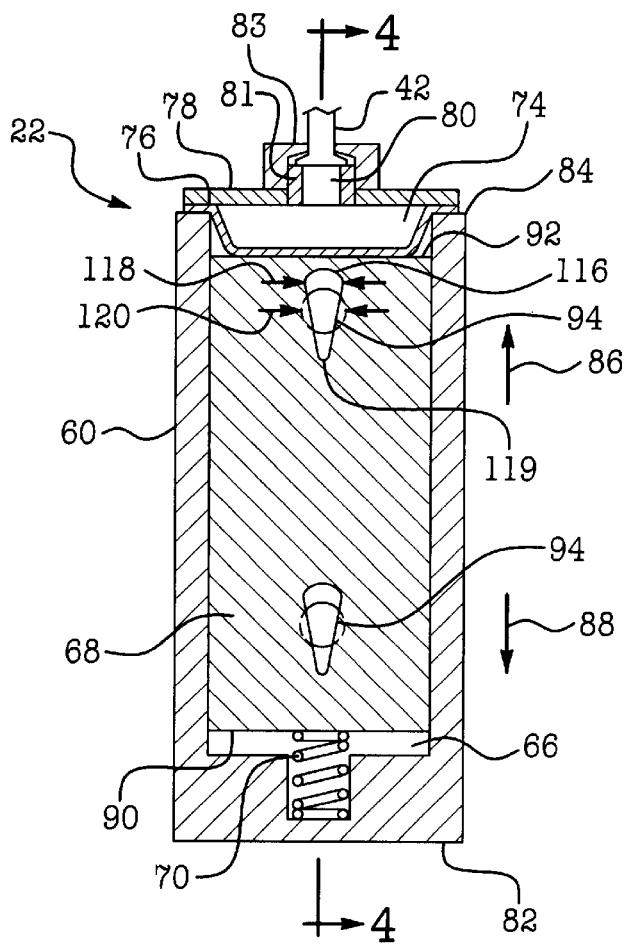
FIG. 3 is a sectional view of the variable orifice valve shown in FIG. 2, taken along view line 3—3.
Figure 4:
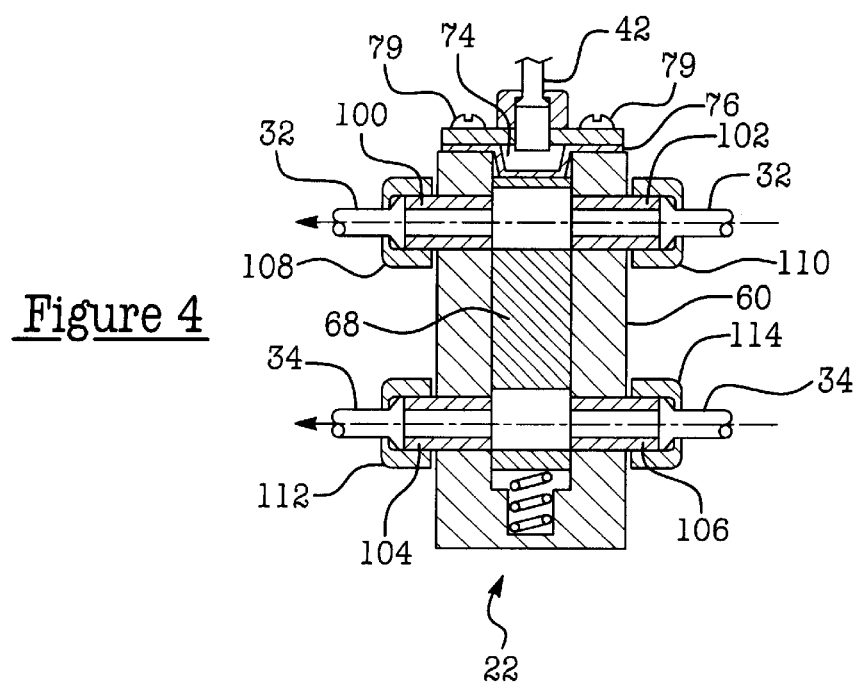
FIG. 4 is a sectional view of the variable orifice valve shown in FIG. 2, taken along view line 4—4 as shown in FIG. 3.

Referring now to FIGS. 2–4, variable orifice valve 22 includes a generally cylindrical housing 60 including a bottom flange portion 62 which includes a pair of apertures 64 which are adapted to receive conventional fasteners (not shown) for selective attachment to cylinder 20. Housing 60 includes a generally cylindrical inner cavity 66 which operatively contains a movable valve member or piston 68, a conventional spring 70 which is disposed in a first end 82 of cavity 66 and/or housing 60, and a selectively expandable sealed chamber 74 which is disposed in a second end 84 of cavity 66 and/or housing 60. Housing 60 further includes generally cylindrical conduits 100, 102 and 104, 106 which are integrally formed and/or sealingly attached to and within housing 60, and which are respectively and sealingly coupled to conduits 32 and 34. Particularly, conduit 32 is attached to conduits 100, 102, by use of cap members 108, 110 which are conformingly (e.g. frictionally), threadingly or otherwise sealingly secured to the conduits 100, 102, respectively, and conduit 34 is attached to conduits 104, 106, by use of cap members 112, 114 which are conformingly (e.g. frictionally), threadingly or otherwise sealingly secured to the conduits 104, 106, respectively.

Spring 70 is a conventional spring which engages the "bottom" surface 90 of member 68 and exerts a biasing force to member 68 in the direction of arrow 86.

Sealed chamber 74 contains a selectively expandable diaphragm 76 which is sealingly engaged between cover 78 and housing 60. In the preferred embodiment, cover 78 is attached to housing 60 by use of conventional fasteners 79. Expandable diaphragm 76 further abuttingly engages the "top" surface 92 of movable member 68. Conduit 42 is sealingly coupled to a conduit 81 formed within cover 78 by use of a cap member 83. Conduit 81 includes a centrally disposed channel 80 which fluidly communicates with sealed chamber 74 and allows pressurized fluid from conduit 42 to enter into chamber 74.

Movable member 68 is generally cylindrical and is shaped to conform to the interior surfaces of housing 60. In this manner, member 68 is slidably movable within cavity 66 in the directions of arrows 86, 88. Member 68 includes a pair of substantially identical tapered channels 94 which extend through member 68 and which cooperate with conduits 100–106 to form fluid flow paths through valve 22. Each channel 94 includes a top rounded portion 116 having a width or thickness 118 which is approximately the same as the diameter 120 of the fluid flow path formed by conduits 100–106, and a bottom tapered or narrowed portion 119 which is substantially narrower than diameter 120.

Steering control valve 28 is a conventional steering control valve which receives steering shaft 14 and which selectively provides fluid pressure to conduits 32, 34 based upon the rotary motion of shaft 14. Particularly, when the steering shaft 14 is rotated, valve 28 is actuated, effective to provide a corresponding amount of pressure to chambers 24 and 26 of cylinder 20, thereby causing the cylinder 20 to properly augment the driver-provided steering force. When valve 28 is not actuated, fluid is allowed to flow back to source 30 through conduit 40.

In operation, controller 44 monitors sensors 46 to determine the amount of fluid pressure to be provided to the steering assembly 10. Particularly, controller 44 uses a conventional power steering algorithm to control the operation of valve 38 to determine the amount of pressure to be used to assist in steering. For example, at relatively high vehicle speeds and relatively low steering wheel angle positions, controller 44 and valve 38 cooperatively cause a lower fluid pressure to be communicated to control valve 28, thereby reducing the amount of hydraulic assist force and making the vehicle's steering "stiffer" or tighter. At relatively low speeds and relatively high steering wheel angle positions, controller 44 and valve 38 cooperatively cause a higher fluid pressure to be communicated to control valve 28, thereby increasing the amount of hydraulic assist force and making the vehicle easier to steer.

Importantly, the alteration in pressure provided to the steering system 10 controls the operation of valve 22 in a manner which provides a desired amount of damping. That is, when controller 44 and valve assembly 38 cooperate to lower the pressure of fluid within system 10, the pressure of fluid communicated to valve 22 through conduit 42 is concomitantly reduced. The reduction in fluid pressure and the force of spring 70 and the contracting force of diaphragm 76 forces fluid out of chamber 74, thereby reducing the size of chamber 74 and causing member 68 to move "upward" in the direction of arrow 86. Member 68 moves to a position near the "top" end 84 of housing 60 in which the narrow ends 119 of channels 94 are aligned with conduits 100, 102 and 104, 106. As a result, the volume of the fluid flow paths through valve 22 is substantially reduced, and the amount of fluid which is allowed to pass in and out of cylinder 20 through conduits 32, 34 is concomitantly reduced.

This reduced fluid flow in and out of cylinder 20 causes cylinder 20 to exhibit higher damping characteristics. This relatively high damping provides improved resistance to impacts, raises dynamic toe resonance frequency, and increases resistance to steering shimmy/nibble. Hence, when the volume of the fluid flow paths in and out of cylinder 20 is reduced, the cylinder 20 and rack 16 function as a conventional shock (which have similarly low fluid in/out characteristics) in response to impact and vibration. Particularly, impacts and vibrations which are transferred from the wheels of the vehicle through the tie rod assembly 18 are absorbed by the cylinder 20 which exhibits damping characteristics. As a result, during relatively high vehicle speeds and neutral steering wheel angle positions, steering system 10 reduces the impacts felt from the front tires of the vehicle, and less motion and impact force is transmitted to the driver.

When controller 44 and valve assembly 38 cooperate to raise the pressure of fluid within system 10, the pressure of fluid communicated to valve 22 through conduit 42 is concomitantly increased. The increase in fluid pressure causes diaphragm 76 to expand, thereby increasing the size of chamber 74 and causing member 68 to move "downward" in the direction of arrow 88. Member 68 moves to a position near the "bottom" end 86 of housing 60 in which the widened ends 116 of channels 94 are aligned with conduits 100, 102 and conduits 104, 106. As a result, the volume of the fluid flow paths through valve 22 are substantially increased, and the amount of fluid which is allowed to pass in and out of cylinder 20 through conduits 32, 34 is concomitantly increased. This increased fluid flow in and out of cylinder 20 causes cylinder 20 to exhibit lower damping characteristics. This relatively low damping allows the vehicle to be easily steered.

It should be appreciated that in other alternate embodiments, variable orifice valve 22 may be actuated in a different manner and/or by a different controllable mechanism. For example and without limitation, the pressure responsive actuator (i.e., diaphragm 76) could be replaced with an electronically controlled actuator (e.g., a solenoid) or with any other suitable actuator.

It is understood that the invention is not limited by the exact construction or method illustrated and described above but that various changes and/or modifications may be made without departing from the spirit and/or the scope of Applicants' inventions.

What is claimed is:

1. A valve assembly comprising:
   a housing having an interior cavity and at least one conduit which forms at least one fluid flow path;
   a member slidably disposed within said interior cavity and having at least one tapered channel which cooperates with said at least one conduit to form said at least one fluid flow path, said member being selectively movable from a first position in which said at least one tapered channel causes said at least one fluid flow path to have a first volume, to a second position in which said at least one tapered channel causes said at least one fluid flow path to have a second volume; and
   a selectively expandable diaphragm which is disposed at a first end of said cavity and which abuttingly engages a first surface of said member, said selectively expandable diaphragm being effective to selectively expand upon receipt of an amount of pressurized fluid, effective to cause said member to move from said first position to said second position.

2. The valve assembly of claim 1 further comprising:
   a spring which is disposed at a second end of said cavity and which engages said member, effective to impart a force on said member which causes said member to reside in said first position when said diaphragm is contracted.

3. The valve assembly of claim 1 wherein said at least one conduit is fluidly coupled to a hydraulic cylinder, effective to control fluid flow in and out of said hydraulic cylinder.

4. The valve assembly of claim 1 wherein said housing and said member are generally cylindrical in shape.

5. The valve assembly of claim 1 wherein said first volume is less than said second volume.

6. A method of providing damping within a power steering system which includes a rack and pinion assembly and a hydraulic cylinder which is coupled to said rack and pinion assembly and which provides an assist force to said rack and pinion assembly, said method comprising the steps of:
   providing a variable orifice valve having a slidable piston contained therein and a selectively expandable diaphragm which abuts said piston;
   forming at least one tapered fluid flow path in said piston and fluidly coupling said at least one tapered fluid flow path to said hydraulic cylinder for selectively communicating pressurized fluid to said hydraulic cylinder, effective to selectively cause said hydraulic cylinder to provide said assist force; and
   selectively varying the volume of said at least one tapered fluid flow path by causing said diaphragm to exert a force upon said piston, thereby causing said piston to move within said variable orifice valve.

7. The method of claim 6 wherein said power steering system is operatively disposed within a vehicle, and further comprising the steps of:
   measuring a speed of said vehicle;
   reducing the volume of said at least one fluid flow path when said measured speed increases; and
   increasing the volume of said at least one fluid flow path when said measured speed decreases.

8. The method of claim 7 further comprising the steps of:
   measuring a steering wheel angle of said vehicle;
   reducing the volume of said at least one fluid flow path when said measured steering wheel angle decreases; and
   increasing the volume of said at least one fluid flow path when said measured steering wheel angle increases.

9. A power steering system comprising:

a rack and pinion assembly;

a hydraulic cylinder which is operatively coupled to said rack and pinion assembly and which selectively provides a steering assist force to said rack and pinion assembly;

a variable orifice valve having a movable piston with at least one tapered channel which forms a fluid flow path, said piston being slidably disposed within said variable orifice valve and is movable from a first position to a second position, said variable orifice valve, further having a selectively expandable diaphragm which is disposed at a first end of said variable orifice valve and which abuttingly engages a first surface of said piston, said diaphragm being effective to selectively expand upon receipt of an amount of pressurized fluid, effective to cause said piston to move from said first position to said second position, said variable orifice valve being fluidly coupled to said hydraulic cylinder which allows a certain amount of pressurized fluid to flow in and out of said hydraulic cylinder; and a steering control valve which is operatively coupled to said rack and pinion assembly and is fluidly coupled to said variable orifice valve, said steering control valve being effective to selectively communicate pressurized fluid to said hydraulic cylinder through said at least one tapered channel of said variable orifice valve in response to movement of said rack and pinion assembly, effective to selectively increase and decrease the fluid flow in and out of said hydraulic cylinder, thereby selectively altering the damping characteristics of said hydraulic cylinder.

10. The power steering system of claim 9 further comprising a source of pressurized fluid which is fluidly coupled to said steering control valve and to said variable orifice valve and which provides a flow of pressurized fluid to said steering control valve and to said variable orifice valve.

11. The power steering system of claim 10 wherein said variable orifice valve is effective to receive pressurized fluid from said source and to selectively increase the volume of said fluid flow path formed by said tapered channel by expanding said diaphragm in response to receipt of said pressurized fluid.

12. The power steering system of claim 11 wherein said power steering system is installed on a vehicle and further comprising:

an electronically controlled valve assembly which controls the flow of said pressurized fluid; and a controller which is communicatively coupled to said electronically controlled valve assembly and which selectively controls said valve assembly based upon a speed of said vehicle and a steering wheel position of said vehicle.

13. The power steering system of claim 12 wherein said controller is effective to cause said electronically controlled valve assembly to increase the flow of pressurized fluid when said speed of said vehicle is decreased, and to decrease the flow of pressurized fluid when said speed of said vehicle is increased.

14. The power steering system of claim 13 wherein said controller is further effective to cause said electronically controlled valve assembly to increase the flow of pressurized fluid when said steering wheel angle is increased, and to decrease the flow of pressurized fluid when said steering wheel angle is decreased.

* * * * *